July 9, 1940.  P. F. SPERRY  2,207,075
REEL MEANS FOR PROJECTORS AND DRIVING MEANS THEREFOR
Filed June 26, 1939  4 Sheets-Sheet 1
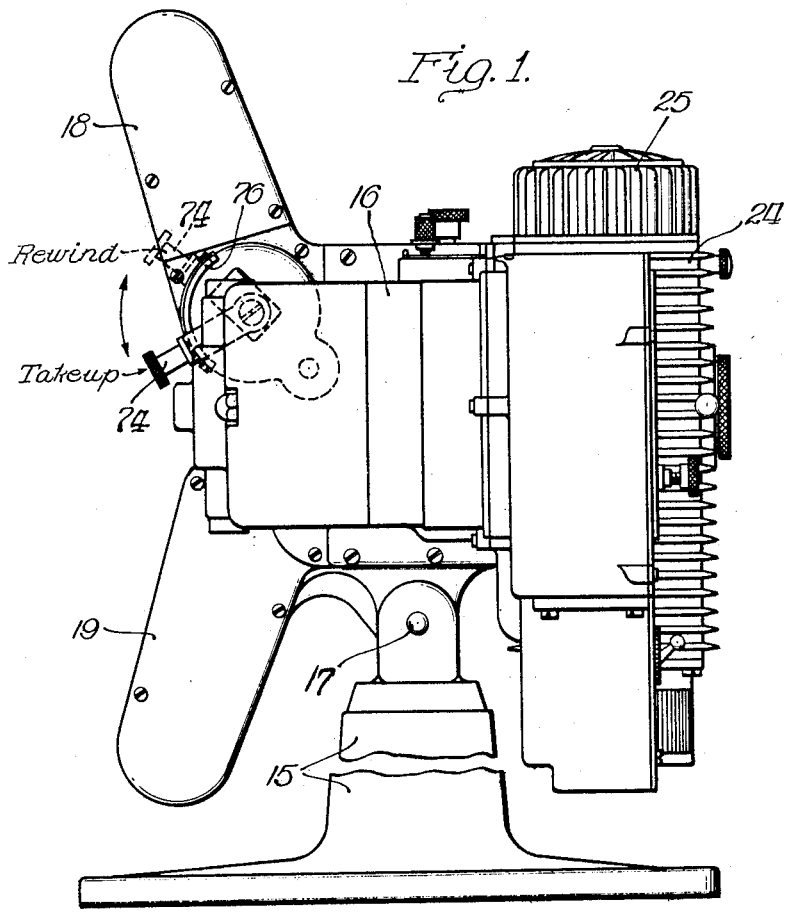
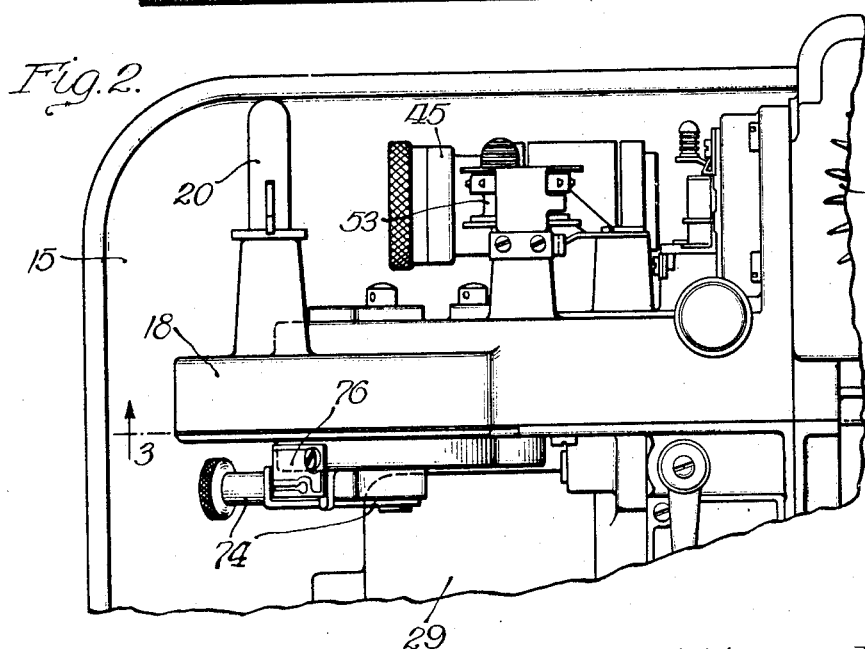
INVENTOR,—
Philmore F. Sperry,
BY Zabel, Carlson, Gritzbaugh and Wells,
ATTORNEYS.

July 9, 1940. P. F. SPERRY 2,207,075
REEL MEANS FOR PROJECTORS AND DRIVING MEANS THEREFOR
Filed June 26, 1939 4 Sheets-Sheet 3
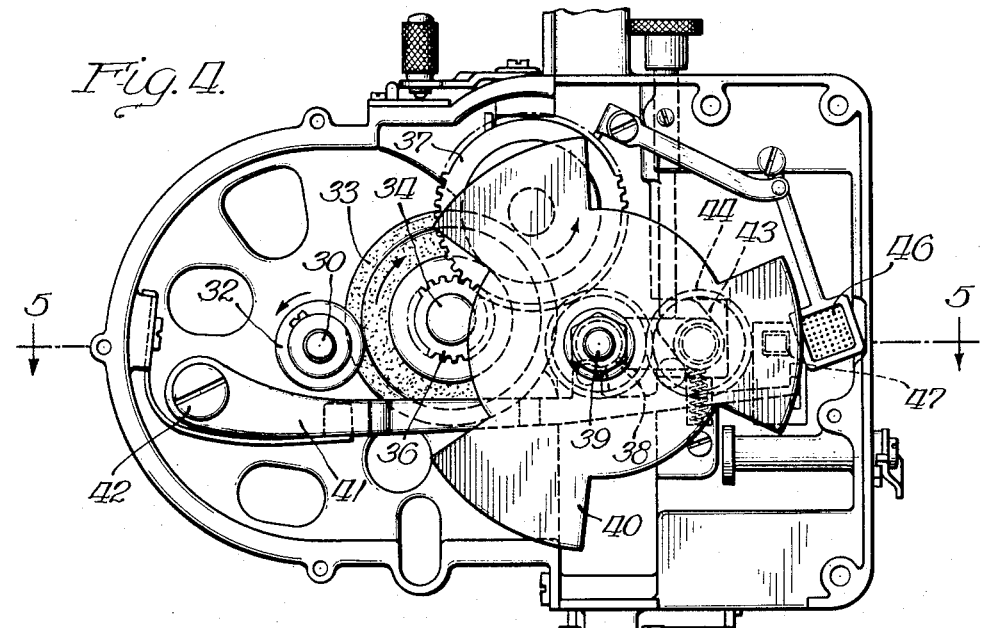
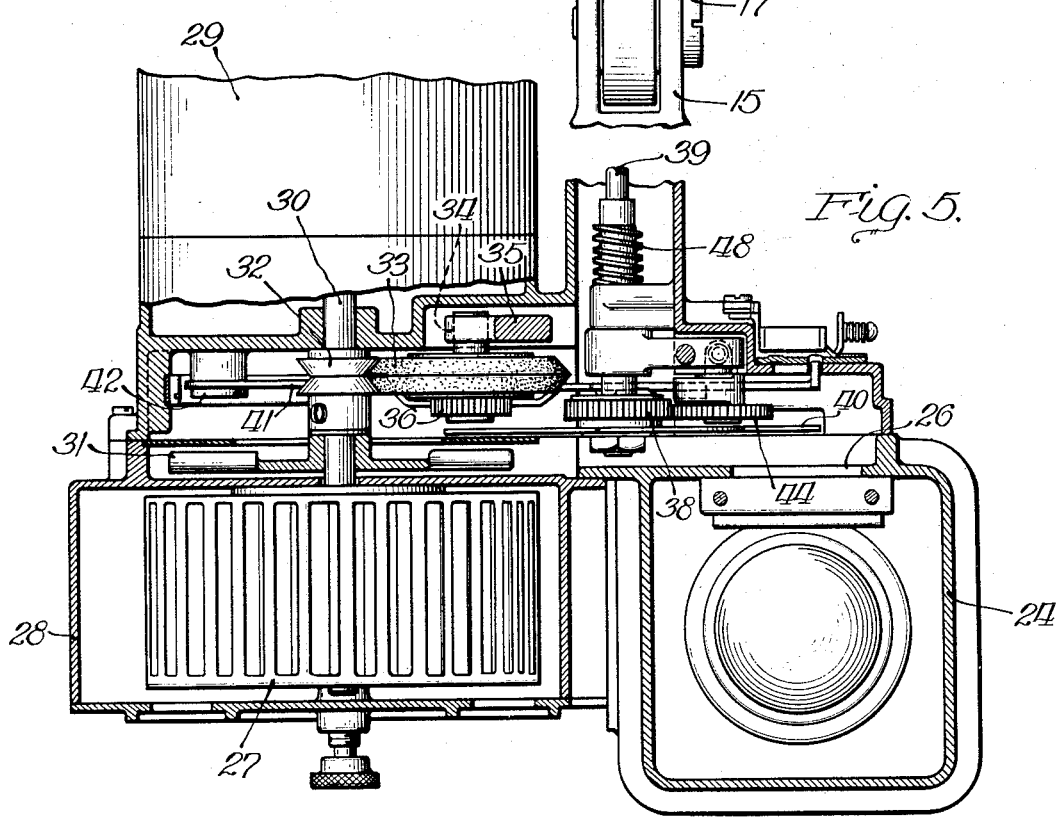
INVENTOR,—
Philmore F. Sperry,
BY Zabel, Carlson, Gritzbaugh and Wiles,
ATTORNEYS.

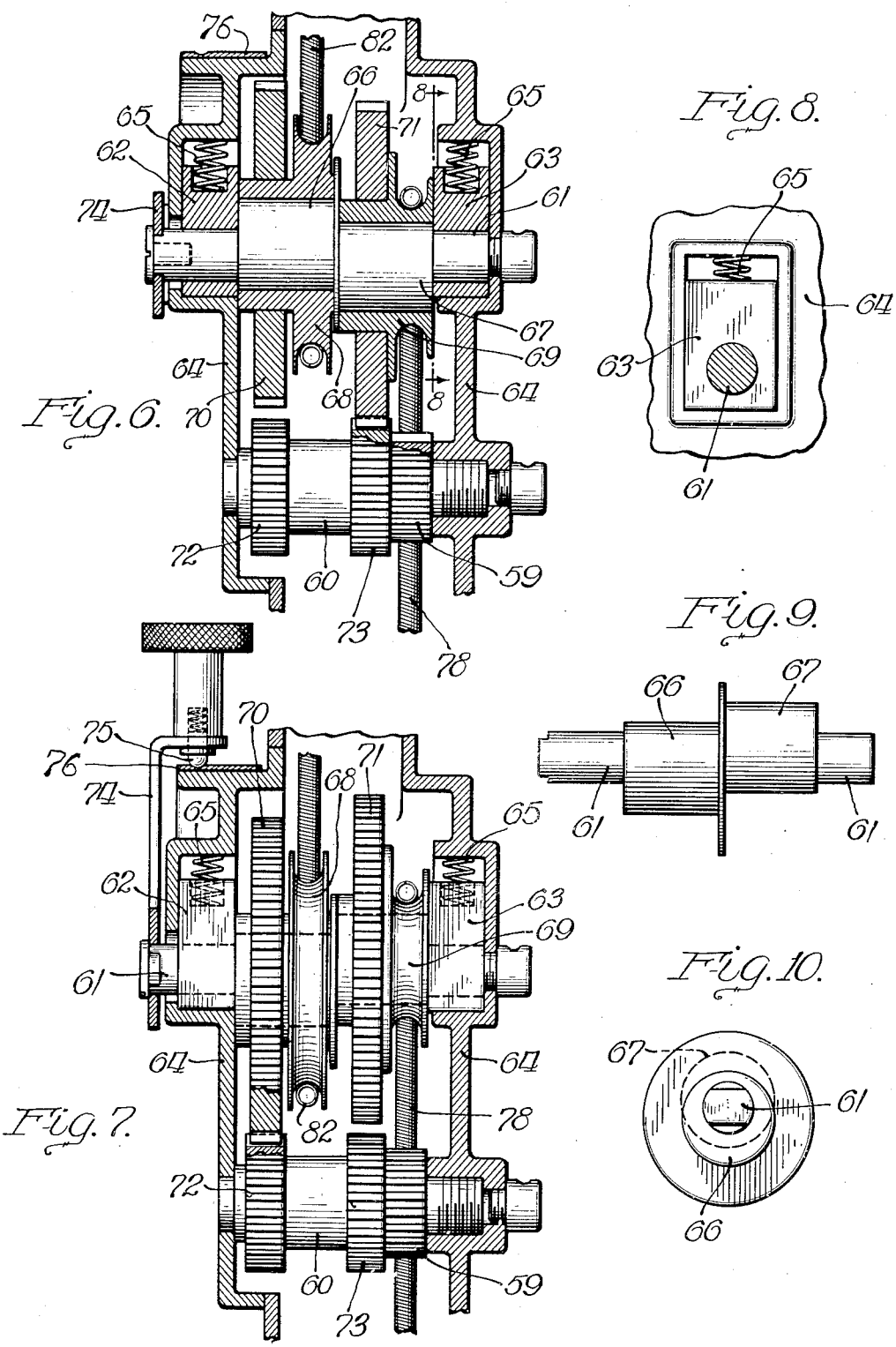

Patented July 9, 1940

2,207,075

UNITED STATES PATENT OFFICE 2,207,075

REEL MEANS FOR PROJECTORS AND DRIVING MEANS THEREFOR

Philmore F. Sperry, Chicago, Ill., assignor to Revere Camera Company, Chicago, Ill., a corporation of Delaware Application June 26, 1939, Serial No. 281,229

7 Claims. (Cl. 242—55)

This invention relates to the film reeling apparatus of a projector and to the means for driving the reels for the normal operation of the projector and alternatively for the rewinding of the film after a run preparatory for the next run of the film, and it is the object of the invention to provide a new and improved form and arrangement of parts by reason of which the drive may be shifted from one to the other of two reels quickly and easily so as to drive the film at the desired speed of movement for the operation of the projector and then drive the film at comparatively much higher speed in the opposite direction for the rewinding operation.

In the improved construction as shown in the drawings, the mechanisms for driving the reels are actuated from one of the shafts employed for giving the film a step by step movement through the machine, the arrangement being such that the intermittent feeding mechanism continues to operate in normal condition both when the reels are controlled for normal operation of the machine and when the reels are set for a rewinding operation, the film being released from the step by step movement mechanism when the rewinding is to be effected.

The invention comprises a novel arrangement of means for connecting the driving means for one of the reels with the step by step movement mechanism of the projector and for alternatively connecting the driving means for the other reel with said step by step movement mechanism, this result being attained in the improved arrangement shown by the use of a plurality of gears differentially mounted on an eccentric shaft so that either one of the reels may be held in operative position to the exclusion of the other. The invention comprises further an improved arrangement by which the parts are enabled to yield to the necessary extent for permitting the gears to slide into mesh without danger of breaking a tooth when the drive is shifted from one pinion to the other. This is accomplished in the arrangement shown by supporting the eccentric shaft in slidably mounted bearing blocks which permit the shaft to have delayed movement as may be required for a smooth meshing effect.

It is another object of this invention to improve devices of this type in sundry details hereinafter pointed out. The preferred means by which these objects have been attained are shown in the accompanying drawings, in which—

Fig. 1 is a side face view of a projector embodying my improved construction;

Fig. 2 is an enlarged top plan view of a portion of the structure shown in Fig. 1;

Fig. 4 is a vertical sectional view taken substantially at the line 4—4 of Fig. 3;

Fig. 5 is a horizontally sectional view taken substantially at the line 5—5 of Fig. 4;

Fig. 6 is a sectional view taken substantially at the line 6—6 of Fig. 3;

Fig. 7 is a view somewhat similar to Fig. 6 but showing a changed position of the parts;

Fig. 8 is a horizontal sectional view taken substantially at the line 8—8 of Fig. 6;

Fig. 9 is a face view of an eccentric operating shaft forming a part of the apparatus shown in Fig. 6; and Fig. 10 is an end view of said shaft as seen from the left in Fig. 9.

Figure 3:
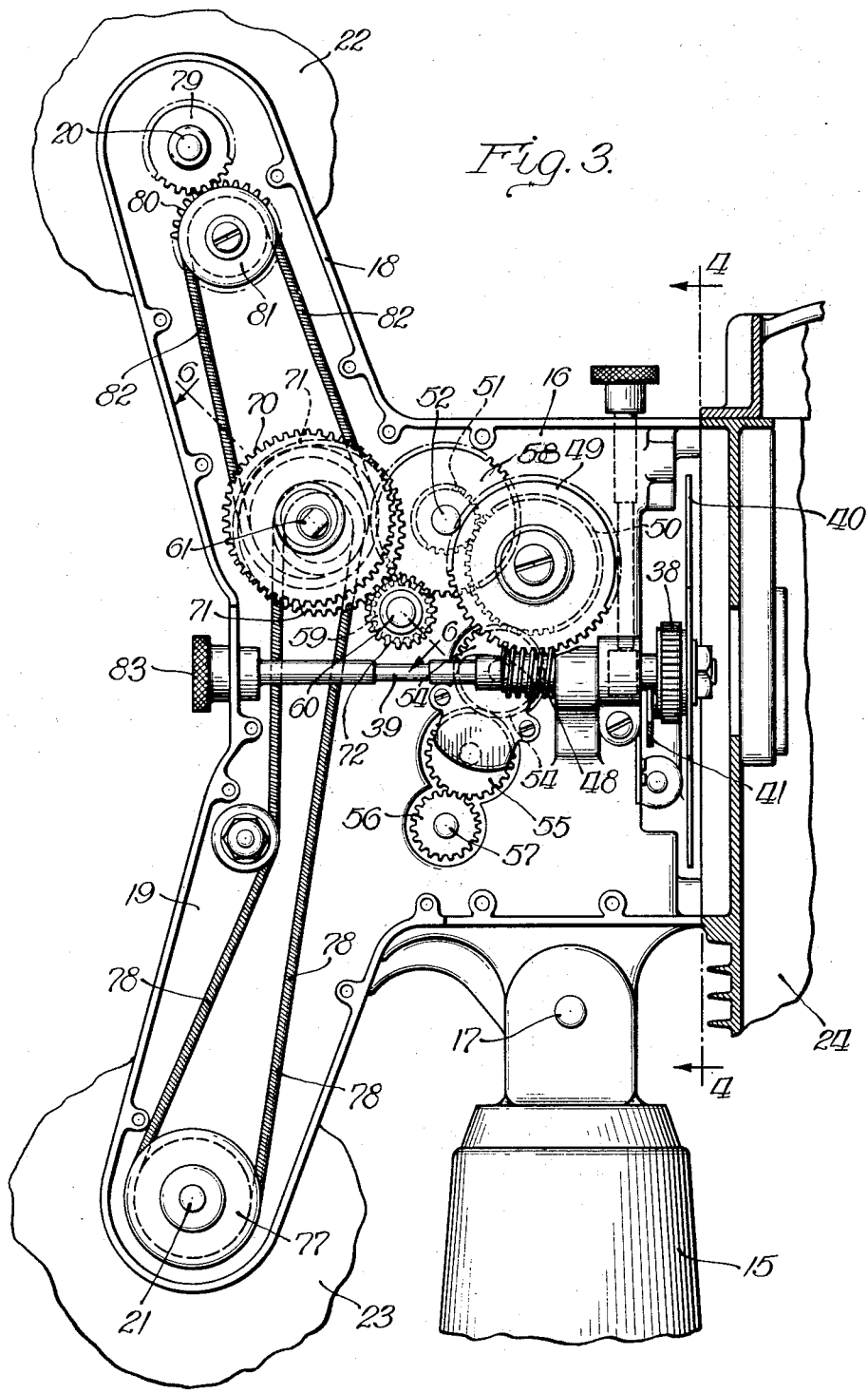
Fig. 3 is a vertical sectional view taken on an enlarged scale at the line 3—3 of Fig. 2.

Referring now to the several figures of the drawings, in which corresponding parts are indicated by the same reference characters, 15 indicates a base member having a framework 16 pivotally mounted thereon by means of a horizontal pivot pin 17, the framework comprising an upwardly extending arm 18 and a downwardly extending arm 19 having spindles 20 and 21 respectively rotatably mounted on said arms for supporting and driving film winding reels 22 and 23, as is best shown in Fig. 3. In the arrangement shown, the framework 16 and the arms 18 and 19 are in the form of housings communicating with each other and having the driving means for the winding reels mounted therein.

In the construction illustrated (see Fig. 5), a lamp housing 24 is provided, having a cap 25 thereon provided with ventilating openings therein as usual in structures of this type. The beam of light from the chamber 24 passes forwardly through an opening 26 and through a film held in position by control means of any suitable type located in front of said opening. A centrifugal fan 27 is provided in a housing 28 at the rear at one side of the lamp housing 24, such fan 27 being driven by a motor mounted in the housing 29 in front of the chamber 28, the fan 27 in the arrangement shown being mounted directly upon the motor shaft 30. The air stream from the fan 27 is delivered directly to the lamp housing 24 for keeping the temperature therein down to a safe limit. Between the motor and the housing 28, I have provided a second fan 31 fixedly mounted on the motor shaft 30 so as to draw air in through the motor and to deliver a stream of air toward the right in Fig. 5 into contact with the film and its associated parts in front of the opening 26.

For driving the film handling mechanism from the motor, I have provided a driving pulley 32 on the motor shaft 30, from which power is transmitted to a driving wheel 33 formed of cork and rotatably mounted by means of a shaft 34 in an arm 35 which is movable for carrying said driving wheel into and out of operative engagement with the pulley 32. For transmitting the power from the driving wheel 33, I have provided a pinion 36 fixedly mounted on the shaft 34, such pinion meshing with a gear 37 (see Fig. 4) which in turn meshes with a pinion 38 carried by a shaft 39 upon which a shutter 40 is mounted. The film is actuated by a shuttle 41 pivotally mounted on a machine screw 42 and moved vertically and sidewise in timed relation by actuating means carried by the shaft 39 at the front face of the pinion 38 and by a cam 43 driven by a pinion 44 meshing with the pinion 38. In front of the opening 26 ahead of the gate mechanism for the film, I have provided a lens housing 45, as is shown in Fig. 2, by which the light ray is controlled. In Fig. 4, I have shown a fire-screen 46 of any suitable type adapted to be swung into position opposite the light opening 47 for preventing the burning of the film in case the film is stopped for any extended period with the light turned on.

Inasmuch as the apparatus above described forms in and of itself no part of the invention sought to be covered by this application, it is believed to be unnecessary to describe such apparatus more fully herein.

For driving the spindles 20 and 21 and the reels 22 and 23 mounted thereon by power from the shaft 39, I have provided a worm 48 on said shaft with which a worm gear 49 meshes, as is best shown in Fig. 3. A gear 50 is mounted to rotate with the gear 49, such gear 50 being arranged for driving a pinion 51 fixedly mounted on a shaft 52 which is provided on its outer end with a sprocket 53 by which the film is forwarded for a projection operation (see Fig. 2). The gear 50 also meshes with a pinion 54, which drives a pinion 55 meshing in turn with a pinion 56 carried by a shaft 57 provided with a second sprocket for forwarding the film, the sprocket on the shaft 57 being located at a distance below the sprocket 53 as shown in Fig. 2, and said two sprockets being driven by the mechanism described at the same rate of speed.

The shaft 52 is also provided with a gear 58 fixedly mounted thereon, so as to drive a pinion 59 fixedly mounted on a shaft 60 (see Figs. 3 and 6). At a short distance above the shaft 60, I have mounted a shaft 61, such shaft being mounted in bearing blocks 62 and 63 which are slidably mounted in suitable slideways in the adjacent frame members 64 so as to permit the shaft 61 to move toward and from the shaft 60, springs 65 being provided adapted normally to hold the bearing blocks in their lowermost positions as shown in Figs. 6 and 7. As is best shown in Fig. 9, the shaft 61 comprises eccentric bearing portions 66 and 67 upon which pulleys 68 and 69 are rotatably mounted, said pulleys having gears 70 and 71 respectively fixedly mounted thereon so as to rotate therewith.

Upon the shaft 60 opposite to the gears 70 and 71, I have provided pinions 72 and 73 so as to rotate with the pinion 59. The arrangement is such that when the shaft 61 stands in the turned position as shown in Fig. 6, the gear 71 has operative driving connection with the pinion 73 and that when the shaft 61 stands in the turned position as shown in Fig. 7, the gear 70 has operative driving connection with the pinion 72. By the use of this arrangement, I am enabled to drive either the pulley 68 or the pulley 69, depending on the position of the shaft 61. For controlling the position of said shaft 61, I have provided a handle or lever 74 having a spring-pressed detent 75 therein adapted by engagement with a segment 76 to hold the shaft releasably in the adjusted position to which it is turned. By reason of the use of the slide block arrangement for the mounting of the shaft 61, the gears are protected against damage in case they fail to mesh properly when moved into engagement with each other.

As is clearly shown in Fig. 3, the spindles 20 and 21 are operatively connected with the pulleys 68 and 69 respectively. For effecting this purpose, the spindle 21 is provided with a pulley 77 fixedly mounted thereon, the pulleys 69 and 77 being connected by an endless belt 78 formed from a coiled spring so as to be adapted to remain tight as the pulley 69 is moved toward and from the pulley 77. For driving the spindle 20 a pinion 79 is fixedly mounted thereon, meshing with a pinion 80 which has a pulley 81 connected so as to rotate therewith, said pulleys 81 and 68 being connected by an endless belt 82 formed from a coiled spring. The arrangement of the driving means as just described is such that the reel 23 which is active during the projection operation of the machine is driven at such speed as to insure that the film shall be wound on the reel as rapidly as it moves through the machine at the start of a projection operation. As the effective size of the reel increases by reason of the accumulation of the film on the reel, the belt 78 is adapted to slip to the necessary extent for preventing undue strain on the film. When the reel 22 is being driven for rewinding the film after the end of a run, the film is to be out of engagement with the sprockets so as to make it unnecessary at that time to provide for slippage of the driving parts.

For driving the reel means independently of the motor 29, I have extended the shaft 39 through the wall of the housing and have provided a knurled head 83 on the shaft by which the shaft and the worm 48 may be rotated manually when desired in connection with the threading of the film or at any other time.

While I prefer to employ the form and arrangement of parts as shown in my drawings and as above described, it is to be understood that my invention is not limited to the arrangement shown except so far as the claims may be so limited, it being understood that changes might well be made in the form and arrangements of the parts without departing from the spirit of my invention.

I claim:

1. In a mechanism of the type described, the combination of two spindles in spaced relation to each other for supporting and driving winding reels mounted on said spindles respectively, a shaft having two eccentric bearings thereon, pulleys rotatably mounted on said bearings, gears fixedly connected with said pulleys, other pulleys operatively connected with said spindles respectively, elastic endless belts connecting said first-named pulleys with said other pulleys for driving said spindles from said gears, a second set of gears adjacent to said first-named gears, and means for rotating said shaft for bringing either of said first-named gears into operative driving relation with the adjacent one of said second set of gears and for holding the other of said first-named gears at the same time out of engagement with the other of said second set of gears.

2. In a mechanism of the type described, the combination of two spindles in spaced relation to each other for supporting and driving winding reels mounted on said spindles respectively, a shaft having two eccentric bearings thereon, pulleys rotatably mounted on said bearings, gears fixedly connected with said pulleys, other pulleys operatively connected with said spindles respectively, elastic endless belts connecting said first-named pulleys with said other pulleys for driving said spindles from said gears, a second shaft rotatably mounted adjacent to said first-named shaft, a second set of gears fixedly mounted on said second shaft adjacent to said first-named gears, and means for rotating said first-named shaft for bringing either of said first-named gears into operative driving relation with the adjacent one of said second set of gears while holding the other of said first-named gears out of engagement with the other of said second set of gears.

3. In a mechanism of the type described, the combination of a frame, two spindles rotatably mounted on said frames in spaced relation to each other for supporting and driving winding reels mounted on said spindles respectively, a shaft rotatably mounted on said frame, a second shaft rotatably mounted on said frame alongside of said first-named shaft so as to be movable yieldingly away from said first-named shaft and having two eccentric bearings thereon, a pair of gears rotatably mounted on said eccentric bearings of said second shaft, a second pair of gears fixedly mounted on said first-named shaft adjacent to said first-named gears and arranged so that when said second shaft is rotated in one direction one of said first-named gears is driven from one of said second-named gears and that when said second shaft is rotated in the opposite direction the other of said first-named gears is driven from the other of said second-named gears, means for rotating said second shaft, and driving connections between said first-named gears and said spindles respectively effective for driving with either of said first-named gears in driving engagement with the adjacent second-named gear.

4. In a mechanism of the type described, the combination of a frame, two spindles rotatably mounted on said frame in spaced relation to each other for supporting and driving winding reels mounted on said spindles respectively, a shaft rotatably mounted on said frame, bearing blocks slidably mounted on said frame opposite to said shaft, springs normally pressing said bearing blocks toward said shaft, a second shaft rotatably mounted in said bearing blocks and having two eccentric bearings thereon, a pair of gears rotatably mounted on said eccentric bearings of said second shaft, a second pair of gears fixedly mounted on said first-named shaft adjacent to said first-named gears and arranged so that when said second shaft is rotated in one direction one of said first-named gears is driven from one of said second-named gears and that when said second shaft is rotated in the opposite direction the other of said first-named gears is driven from the other of said second-named gears, means for rotating said second shaft, and driving connections between said first-named gears and said spindles respectively effective for driving with either of said first-named gears in driving engagement with the adjacent second-named gear.

5. In a mechanism of the type described, the combination of a framework comprising upwardly and downwardly extending arms, spindles rotatably mounted on said arms respectively for supporting winding reels thereon, a pulley connected with one of said spindles, a second pulley connected by intermeshing gears with the other of said spindles, a shaft rotatably mounted on said framework having two eccentric bearings thereon, two other pulleys rotatably mounted on said eccentric bearings, gears fixedly connected with said other pulleys, other gears rotatably mounted on said framework in position for meshing alternatively with said first-named gears, endless belts connecting said first-named two pulleys with said second-named two pulleys respectively, and means for rotating said shaft for bringing either of said first-named two gears into operative engagement with the corresponding one of said second-named gears.

6. In a mechanism of the type described, the combination of two spindles in spaced relation to each other for supporting and driving winding reels mounted on said spindles respectively, a shaft, two intermediate gears rotatably mounted on said shaft in eccentric position with respect to each other thereon, a second set of gears adjacent to said intermediate gears respectively, means for rotating said shaft for bringing either of said intermediate gears into operative driving relation with the adjacent one of said second set of gears while holding the other intermediate gear out of engagement with the other of said second set of gears, driving connections between said intermediate gears and said spindles respectively effective for driving with either of said intermediate gears in operative driving relation, means comprising a worm and a cooperating worm gear for driving said second-named two gears in unison, and manually operable means connected with said worm effective alternately for giving said worm a rotary movement.

7. In a mechanism of the type described, the combination of a frame, a rock shaft rotatably mounted on said frame, two gears rotatably mounted on said rock shaft on axes in slightly spaced relation to each other and in slightly spaced relation to the axis of rotation of the shaft, two other gears rotatably mounted on said frame in close proximity to said first-named gears respectively in position to have meshing engagement with said first-named gears alternatively as said rock shaft is given a rotary movement, means for driving said second-named two gears, spindles rotatably mounted on said frame in spaced relation to said gears, driving connections between said spindles and said first-named gears respectively, and adjustable means for giving said rock shaft a rotary movement and for holding it releasably in position for driving either of said spindles as desired.

PHILMORE F. SPERRY.